March 12, 1940.  F. B. STRATFORD  2,193,436
RAKE
Filed Jan. 15, 1938
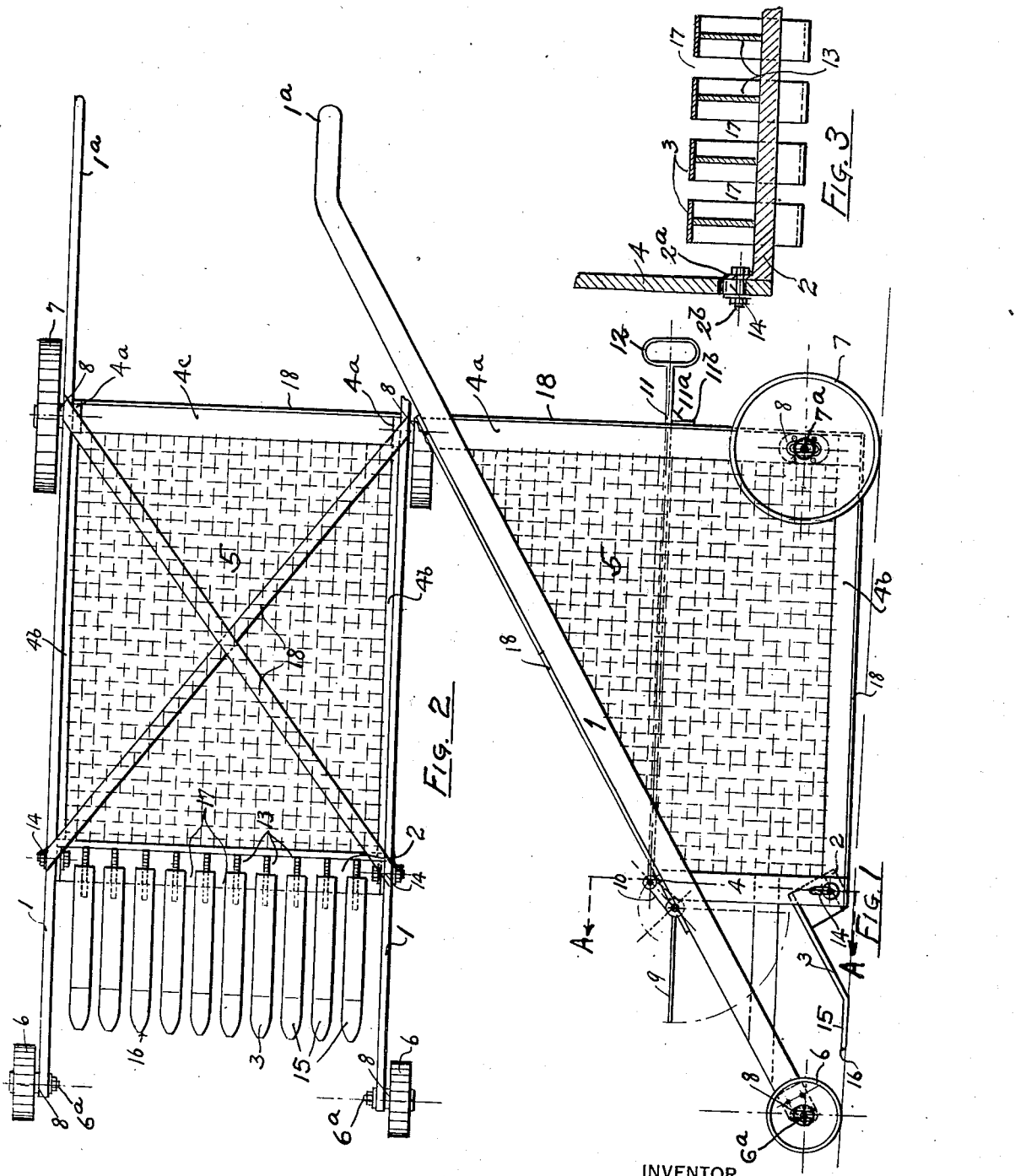
INVENTOR
FRANK B. STRATFORD
BY
ATTORNEYS.

Patented Mar. 12, 1940

2,193,436

UNITED STATES PATENT OFFICE 2,193,436

RAKE

Frank B. Stratford, Montclair, N. J.

Application January 15, 1938, Serial No. 185,136

5 Claims. (Cl. 56—400.14)

The invention relates to rakes and has for its object to provide a rake of novel construction designed primarily for gathering and removing mowed grass, fallen leaves and the like, from lawns and similar places. The invention contemplates particularly the provision of a rake constructed in a manner to gather up the mowed grass, leaves and the like, without the usual clogging of the rake teeth or tines, and to accommodate and efficiently carry relatively large quantities of grass, leaves and the like. Another object of the invention is to provide a novel rake in which the rake teeth or tines will automatically accommodate themselves to the surface contour of the ground over which the rake is operated. Other more specific objects will appear from the description hereinafter and the features of novelty will be pointed out in the claims.

In the accompanying drawing which illustrates an example of the invention without defining its limits, Fig. 1 is a side elevation of the novel rake; Fig. 2 is a plan view thereof with parts omitted and partly broken away, and Fig. 3 is an enlarged detail section on the line A—A of Fig. 1.

In its illustrated form the rake comprises spaced parallel side members 1 preferably inclined upwardly and terminating at their upper ends in the form of handles 1a whereby the rake may be manually operated; if the rake is mechanically driven, the handles 1a or their equivalent, may serve to control and guide the rake in its operation. The side members 1 support a framework consisting of depending vertical front members 4 and rear members 4a suitably attached to said side members 1, and horizontally disposed bottom side members 4b and rear members 4c forming a rectangular frame connected with the depending front and rear members 4 and 4a in any convenient manner. The framework formed by the members 4, 4a, 4b and 4c supports a receptacle or basket 5 which may be made of wire netting or other suitable material and is open at least at its forward end and preferably also at the top; it will be understood that the basket 5 may be either permanently or removably fixed in place in any well-known way.

The device further includes a cross-bar 2 extending transversely thereof and provided with upright lugs 2a whereby said cross-bar 2 is secured to the lower ends of the depending front members 4. The cross-bar 2 is attached to the depending members 4 preferably so as to be pivotally adjustable relatively thereto, and in the preferred arrangement is also capable of being adjusted in vertical directions relatively to said depending front members 4; in the illustrated form of the device, the lugs 2a are accordingly secured to the depending front members 4 by pivot bolts 2b which themselves are accommodated in slots 14 with which the depending front members 4 are provided, as shown in Fig. 3. The cross-bar 2 serves as a support for the tines 3 which constitute the rake proper, said tines 3 in the arrangement shown in the drawing having their inner ends located at a distance above the cross-bar 2 and being mounted in position thereon for instance by means of upright web plates 13; the latter are suitably secured in place on the cross-bar 2 in spaced parallel relation to each other to fix the tines 3 in similar spaced relation and to provide a plurality of adjacent open ended spaces and slots 17 which establish open communication with the basket 5 for the purpose to be more fully set forth hereinafter.

The tines 3 are formed of flexible material to automatically accommodate themselves to the surface contour of the ground over which the rake is operated, or are mounted in a manner to secure the same result. As shown in the drawing, the tines 3 are inclined upwardly toward the basket 5 and preferably are formed at their outer free ends with relatively horizontal portions 15 and in any case have said outer ends rounded as shown at 16, or otherwise shaped to prevent digging into the ground.

The device is preferably mounted upon front wheels 6 located at the lower forward ends of the side members 1, and with rear wheels 7 located at the lower ends of the rear depending members 4a. The aforesaid side members 1 with their handles 1a and the framework consisting of the members 4, 4a, 4b and 4c thus constitute a mobile carrier on which the receptacle or basket 5, and other elements of the device, are supported. For the purpose of selectively regulating the distance of the device above the ground, the wheels 6 and 7 are preferably mounted so as to be adjustable relatively to the members 1 and 4; this adjustability is secured in the illustrated example by providing the side members 1 and the rear depending members 4a with vertical slots 8 for the reception of the axle bolts 6a and 7a of the respective wheels 6 and 7.

To prevent the contents of the basket 5 from being unintentionally spilled when the collected material is being transferred to a point of disposal, a pivotally movable closure 9 may be provided for the normally open front end of the basket 5. In the form shown in the drawing, the closure 9 is hinged or journalled on the side members 1 and is manually operated in any convenient manner; for instance, as shown, one of the journals may carry a lever 10 which is pivotally connected with and controlled by means of an operating rod 11 terminating in a handle 12 located within convenient reach of the operator. Any suitable means may be included in the device for temporarily fixing the closure 9 in the open position shown by solid lines in Fig. 1; for instance, the rod 11 may be provided with a depending projection 11a arranged to detachably engage a suitable detent 11b located in co-operating relation at a proper point of the device.

For the purpose of strengthening the device, suitable means may be provided as illustrated for instance by the diagonal braces 18 located as illustrated in the drawing.

In practice, the wheels 6 and 7 are adjusted to locate the device at the desired distance above the ground, and the tines 3 are set in a position to cause said tines to engage the ground on their forward ends under a resilient tension because of their inherent flexibility, or with a corresponding pressure because of the method of mounting said tines, and the closure 9 is temporarily adjusted to its open position as illustrated by solid lines in Fig. 1. The rake may then be propelled over the ground manually by means of the handles 1a, it being understood that if the device is mechanically operated that said handles 1a may be used to control and guide the same in its travel over the ground. As the rake is thus propelled either manually or mechanically, the tines 3 will pass in contact with the surface of the ground and at their free ends will automatically adjust themselves to the contour thereof, or in other words, will automatically follow any unevenness in the surface of the ground over which the device is being operated.

Assuming that the rake is being utilized to collect fallen leaves, the latter will be progressively picked up by the forward ends of the tines 3 and will pass upwardly along said tines and finally drop into the basket 5 in which said leaves are collected. Any leaves which may drop through the spaces between adjacent tines 3 will be forced through the slots 17 and into the basket; it will be noted that the slots 17 provide open communication with the basket 5 so that the leaves are permitted to move freely back into the basket 5 and the customary clogging between the tines which occurs in most existing types of rakes is entirely avoided. When the basket 5 has been filled or for any other reason it is desired to dispose of the contents thereof, the handle 12 is lifted to disengage the projection 11a from the detent 11b and to thereby enable the closure 9 to be adjusted to the closed position indicated by dotted line in Fig. 1. The contents of the basket 5 are thus confined within the basket 5 after which the device may be propelled to a point of disposal whereupon the closure 9 may be again adjusted to its open position and the contents of the basket 5 removed therefrom, for instance by tilting the device upwardly on the front wheels 6. The aforesaid operations may be repeated as long as is necessary to effect the removal of the leaves or other material being operated upon.

The wheels 6 and 7 not only facilitate the propulsion of the device over the ground, but also because of their adjustability avoid the possibility of developing a drag of the cross-bar 2 and the basket 5 over the ground; these functions are in addition to those set forth hereinabove. The pivotal and vertical adjustments of the cross-bar 2 enable the tines 3 not only to be set at the most efficient distance above the ground, but also readily permit the tines to be adjusted to the inclination which is most effective for the operations being performed by the rake at the time. The rounded points 16 of the tines 3 prevent the latter from digging into the ground and cause said tines to easily ride over the surface thereof; this result is further assured if and when the tines are formed with the relatively horizontal portions 15 as illustrated in Fig. 1 of the drawing.

It will be understood that the web plates 13 whereby the inner ends of the tines 3 are supported on the cross-bar 2, may be replaced by other equivalent means, whereby the same result, that is the open communication with the basket 5 is secured.

The rake is extremely efficient in action and is easily operated manually with comparatively slight effort, or readily controlled when mechanically operated and in any case serves to quickly remove fallen leaves, mowed grass, and other material from lawns and the like, in a minimum of time.

Various changes in the specific forms shown and described may be made within the scope of the claims without departing from the spirit of the invention.

I claim:

1. A a rake comprising upwardly inclined side members located in spaced parallel relation to each other, a framework carried by and depending from said side members, a receptacle supported by said frame and having an open forward end, front wheels adjustably journalled on said side members, rear wheels adjustably journalled on said framework, a closure for closing the open forward end of said receptacle, means whereby said closure may be selectively adjusted to open and closed positions at will, a cross-bar extending transversely of the rake adjacent to the open end of said receptacle, means whereby said cross-bar is connected with said framework in a manner to be pivotally and vertically adjustable thereon, a plurality of upright web plates carried by said cross-bar in spaced parallel relation, and inherently flexible tines having their inner ends mounted on said web plates, said tines having their outer free ends rounded to prevent digging into the ground.

2. A rake comprising a mobile carrier provided with manipulating handles, a receptacle supported on said carrier and having an open forward end, a manually operated closure for controlling said open end, a cross-bar extending transversely of said carrier adjacent to the open end of said receptacle, said cross-bar being mounted upon said carrier in a manner to be pivotally and vertically adjustable thereon, a plurality of upright members carried by said cross-bar in parallel spaced relation, and inherently flexible tines mounted on said upright members and projecting downwardly therefrom in parallel spaced relation to each other.

3. A rake comprising a mobile carrier provided with manipulating handles, a receptacle supported on said carrier and having an open forward end, a cross-bar extending transversely of said carrier adjacent the open end of said carrier, means whereby said cross-bar is connected with said carrier in a manner to be pivotally and vertically adjustable thereon, a plurality of upright members carried by said cross-bar in parallel, spaced relation, and tines mounted on said upright members and inclined downwardly therefrom in parallel spaced relation to each other.

4. A rake comprising a mobile carrier, a receptacle supported on said carrier and having an open forward end, a supporting bar movably mounted on said carrier adjacent the open end of said receptacle, and a plurality of spaced parallel tines having their inner ends mounted on said bar at a distance above the same, said tines being inclined downwardly from said inner ends and having their outer ends formed to prevent digging into the ground as the rake is manipulated.

5. A rake comprising a mobile carrier, a receptacle supported on said carrier and having an open forward end, a cross-bar extending transversely of said carrier adjacent the open end thereof, a plurality of upright members carried by said cross-bar in spaced relation, and tines mounted on said upright members and inclined downwardly therefrom in spaced relation to each other.

FRANK B. STRATFORD.